(12) United States Patent
Purdy et al.

(10) Patent No.: US 10,590,336 B2
(45) Date of Patent: Mar. 17, 2020

(54) METHODS OF USING NOVEL ORGANIC ACID COMPOSITIONS IN THE OIL AND GAS INDUSTRY

(71) Applicant: FLUID ENERGY GROUP LTD., Calgary (CA)

(72) Inventors: Clay Purdy, Medicine Hat (CA); Darren Thatcher, High River (CA); Jon Garner, Stony Plain (CA); Bruce Ulmer, Stony Plain (CA); Alexander David Jamieson, Calgary (CA)

(73) Assignee: Fluid Energy Group Ltd., Calgary, Alberta (CA)

( * ) Notice: Subject to any disclaimer, the term of this patent is extended or adjusted under 35 U.S.C. 154(b) by 0 days.

(21) Appl. No.: 16/025,717

(22) Filed: Jul. 2, 2018

(65) Prior Publication Data

US 2018/0312746 A1 Nov. 1, 2018

Related U.S. Application Data

(63) Continuation of application No. 15/160,434, filed on May 20, 2016, now Pat. No. 10,280,362.

(30) Foreign Application Priority Data

May 28, 2015 (CA) ..................... 2892895

(51) Int. Cl.
| | | |
|---|---|---|
| *C09K 8/74* | (2006.01) | |
| *C09K 8/528* | (2006.01) | |
| *E21B 37/06* | (2006.01) | |
| *E21B 43/25* | (2006.01) | |
| *E21B 33/14* | (2006.01) | |
| *C23F 11/04* | (2006.01) | |

(52) U.S. Cl.
CPC ............... *C09K 8/74* (2013.01); *C09K 8/528* (2013.01); *C23F 11/04* (2013.01); *E21B 37/06* (2013.01); *E21B 43/25* (2013.01); *C09K 2208/32* (2013.01); *E21B 33/14* (2013.01)

(58) Field of Classification Search
None
See application file for complete search history.

(56) References Cited

U.S. PATENT DOCUMENTS

| | | | | |
|---|---|---|---|---|
| 2,687,375 | A * | 8/1954 | Fischer | C09K 8/22 507/114 |
| 2,696,468 | A * | 12/1954 | Fischer | C09K 8/32 175/42 |
| 2,935,129 | A * | 5/1960 | Allen | E21B 43/26 166/283 |
| 3,998,965 | A * | 12/1976 | Gittos | C07C 255/00 514/521 |
| 4,035,497 | A * | 7/1977 | Gittos | C07C 255/00 514/237.5 |
| 4,402,852 | A | 9/1983 | Young | |
| 5,672,279 | A | 9/1997 | Sargent et al. | |
| 6,147,042 | A | 11/2000 | Yata et al. | |
| 6,265,360 | B1 * | 7/2001 | DeTar | C09K 8/524 508/314 |
| 7,938,912 | B1 | 5/2011 | MacDonald | |
| 10,280,362 | B2 | 5/2019 | Purdy et al. | |
| 2003/0181449 | A1 * | 9/2003 | Urbanek | A61K 31/502 514/234.2 |
| 2007/0164258 | A1 | 7/2007 | Emerson | |
| 2009/0221455 | A1 * | 9/2009 | Ke | C09K 8/54 507/261 |
| 2009/0260659 | A1 | 10/2009 | Choczaj | |
| 2011/0251426 | A1 | 10/2011 | Childs | |
| 2013/0260649 | A1 | 10/2013 | Thomson | |
| 2016/0347993 | A1 | 1/2016 | Purdy et al. | |
| 2016/0347994 | A1 * | 12/2016 | Purdy | E21B 37/06 |

* cited by examiner

*Primary Examiner* — John J Figueroa
(74) *Attorney, Agent, or Firm* — Heslin Rothenberg Farley & Mesiti P.C.; Alan M. Fuierer, Esq.

(57) ABSTRACT

Methods of using an organic acid composition in oil industry activities, said composition comprising: methane sulphonic acid, a metal iodide or iodate, and an alcohol or derivative thereof.

11 Claims, No Drawings

METHODS OF USING NOVEL ORGANIC ACID COMPOSITIONS IN THE OIL AND GAS INDUSTRY

CROSS-REFERENCE TO RELATED APPLICATIONS

This application is a Continuation of U.S. patent application Ser. No. 15/160,434 filed May 20, 2016, which claims priority to Canadian Patent Application Serial No. 2,892,895, filed May 28, 2015, the disclosure of which are hereby incorporated by reference herein in their entirety.

FIELD OF THE INVENTION

This invention relates to acid compositions for use in performing various treatments in the oil and gas industry, more specifically to a method of using an organic acid composition as an alternative to conventional acids.

BACKGROUND OF THE INVENTION

In the oil and gas industry, stimulation with an acid is performed on a well to increase or restore production. In many situations various sizes of casing are placed in a well to prevent water table supply contamination, provide isolation between various formations to limit drilling fluid losses, contain high pressure formations, provide a means to secure down hole production equipment such as electric submersible pumps, pressure sensing equipment and isolation production strings etc. To secure these various lengths of casing cement is utilized which typically is of a very high density and resistant to degradation by produced well fluids as well as conventional acids, such as hydrochloric acid. After the well is drilled, a completion program is typically commenced which will stimulate the formations or zones of interest to stimulate oil and gas fluids to flow from the formation into the wellbore. During these stimulations fluids, gels, proppants, chemicals and gases such as nitrogen will be pumped into the formation via the casing perforations (or other completion technique).

One of the challenges facing the industry is breaking down, or cleaning the residual cement and debris left in the perforations or breaking through the actual cement sheath in certain completion techniques such as cemented sleeve ports. During a cemented sleeve port completion operation, coiled tubing tools (or a shifting ball) will be deployed capable of "sliding open" the sleeve which is placed and cemented in position during the casing placement stage of the wells drilling cycle (at the end of the drilling cycle). Once these sleeves are opened there is typically a cement sheath inhibiting flow from the casing to the formation. Acids are typically deployed prior to the frac fluid stage (this acid stage is called a "spearhead"). Most cement blends commonly utilized in the oil and gas industry have minimal acid solubility, hindering the effectiveness of most conventional acids.

Another major challenge operators face is executing remedial (cement) work on existing wells for either the purpose of sealing a leak in the cement portion of the well (causing a communication of well fluids to an undesirable section of the formation or well face), or for an abandonment of a well whose life cycle has expired. In both of these examples there is usually a need to seal any leaks that may be present by executing a "cement squeeze". Typically an acid is pumped prior to the new cement to be placed to ensure an unobstructed pathway for the placement of the new cement to seal the leak or communication. In these situations it is sometimes difficult to obtain an acceptable injection rate of the cement due to the inability of current acids typically used in the industry to solubilize the cement sufficiently.

Common day to day operations utilizing organic and mineral acids in the oil and gas industry include three major types of acid applications: matrix acidizing, fracture acidizing, and spearhead breakdown acidizing. A matrix acid treatment is performed when acid is pumped into the well and into the pores of the reservoir formation below the fracture pressure. In this form of acidization, the acids dissolve the sediments and mud solids that are inhibiting the permeability of the rock, enlarging the natural pores of the reservoir (wormholing) and stimulating flow of hydrocarbons. While matrix acidizing is done at a low enough pressure to keep from fracturing the reservoir rock, fracture acidizing involves pumping highly pressurized acid into the well, physically fracturing the reservoir rock and etching the permeability inhibitive sediments. This type of acid treatment forms channels or fractures through which the hydrocarbons can flow.

There are many different mineral and organic acids used to perform an acid treatment on wells. The most common type of mineral acid employed on wells to stimulate production is hydrochloric acid (HCl), which is useful in stimulating carbonate reservoirs.

One of the major challenges faced in the oil and gas industry from using hydrochloric acid is the extremely high levels of corrosion (which is countered by the addition of 'filming' corrosion inhibitors that are typically themselves toxic and harmful to humans, the environment and equipment, and are very difficult to maintain in solution with the acid over a period of time); reactions between acids and various types of metals can vary greatly but certain metals, such as aluminum and magnesium, are very susceptible to major effects causing immediate damage. Also, hydrochloric acid produces hydrogen chloride gas which is toxic (potentially fatal) and corrosive to skin, eyes and metals. At levels above 50 ppm (parts per million), it can be Immediately Dangerous to Life and Health (IDHL). At levels from 1300-2000 ppm death can occur in 2-3 minutes. The current invention involves an acid that is non-fuming, eliminating this risk for industry personnel.

The inherent environmental effects (organic sterility, poisoning of wildlife etc.) of hydrochloric acids in the event of an unintended or accidental release on surface or downhole into water aquifers or other sources of water are devastating which can cause significant pH reduction of such and can substantially increase the toxicity and could potentially cause a mass culling of aquatic species and potential poisoning of humans or livestock and wildlife exposed to/or drinking the water. An unintended release at surface can also cause a hydrogen chloride gas cloud to be released, potentially endangering human and animal health. This is a common event at large storage sites when tanks split or leak. Typically if near the public, large areas need to be evacuated post event. Because of its acidic nature, hydrogen chloride gas is also corrosive, particularly in the presence of moisture.

The inability for conventional acids and blends of such to biodegrade naturally without neutralizing the soil results in expensive cleanup-reclamation costs for the operator should an unintended release occur. Moreover, the toxic fumes produced by mineral and many organic acids (acetic and formic in particular) are harmful to humans/animals and are highly corrosive and/or explosive potentially. Transportation and storage requirements for these acids are quite restrictive and taxing in such that you must typically haul the products in specialized acid tankers or intermediate bulk containers (IBC) that are rated to handle such corrosive products, bringing exposure dangers for personnel exposed to handling.

Another concern is the potential for spills on locations due to the high corrosion levels of conventional acids which can cause storage container failures and/or deployment equipment failures i.e. coiled tubing or fracturing iron failures caused from high corrosion rates (pitting, cracks, pinholes and major failures). Other concerns include: downhole equipment corrosion causing the operator to have to execute a work-over and replace down hole pumps, tubing, cables, packers etc.; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a blended product locally or very near its end use.

Another problem for industry utilizing conventional acids, and certain acid replacements is high temperature stability. Several operations in the oil industry expose fluids and equipment to very high temperatures (some upward of 200° C.). The compositions used in these various operations need to withstand these high temperatures without losing their effectiveness. These compositions must be capable of being used in operations over a wide range of temperatures while not affecting the equipment with which it comes in contact and yet still remain stable. The current invention has stability up over 180 degrees Celsius and will not lose its solubilizing characteristics as temperature increases as many mineral acids do. Having a high temperature, chemically stable, acid is very attractive to industry for multiple functions such as, but not limited to, acid fracturing, remedial operations, freeing stuck drilling pipe, spearhead acids, high temperature scale mitigation, and constant injection applications for SAGD (Steam Assisted Gravity Drainage) programs.

When used to treat scaling issues on surface due to water/fluid precipitation, acids are exposed to personnel and mechanical devices as well as expensive pumping equipment causing increased risk for the operator and corrosion effects that damage equipment and create hazardous fumes. Conventional acids typically need to be blended with fresh water (due to their intolerance of highly saline water, causing precipitation of minerals) to the desired concentration requiring companies to pre-blend off-site as opposed to blending on-site with produced water thereby increasing costs associated with transportation.

When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel) causing the acids to become very corrosive and resulting in damage to equipment/wells. Having to deal with 'live' acid during the back flush process is also very expensive as conventional acids typically are still at a very low pH and toxic. It is advantageous to have an acid blend that can be exported to production facilities through pipelines that once spent or applied, is commonly a neutral pH greatly reducing disposal costs/fees.

Typically, up to 10 chemical additives can be required to control various aspects of the acids performance adding to obstacles in the handling and shipping logistics. Having an alternative that only requires minimal additives is very advantageous.

In wells that have a high degree of sour gas (hydrogen sulphide) and carbon dioxide, in its composition, there is always a high concern of corrosion. Pipelines are especially of concern, as many variables can create unwanted corrosion and pitting attack on the steels. Any presence of water containing hydrogen sulphide in combination with a certain amount of chlorides will create an acidic effect on the steel, potentially creating corrosion related failures. Any amount of protective scaling mechanism that is generated on the sour gas pipeline walls can also be subject to scale disruption in the presence of chlorides, exposing the surface to corrosion attack. The use of a hydrochloric acid in these types of applications is obviously not possible, due to the high level of chlorides in the mineral acid. Utilizing a high strength acid for downhole scale removal that has virtually no chloride level is an obvious advantage to the application.

Acids perform many actions in the oil and gas industry and are considered necessary to achieve the desired production of various petroleum wells, maintain their respective systems and aid in certain functions (i.e. remedial well intervention, or abandonment of a well that has expired its life cycle). The associated dangers that come with using acids are expansive and tasking to mitigate through controls, whether they are chemically or mechanically engineered. Eliminating, or even simply reducing, the negative effects of acids while maintaining their usefulness is a struggle for the industry, especially at higher temperatures encountered downhole. As the public demand for the use of cleaner/safer/greener products increases, companies are looking for alternatives that perform the required function without all, or most of the, drawbacks associated with the use of conventional acids.

The composition according to the present invention can ideally be used in various oilfield operations; spearhead acid, fracking operations, injection/disposal well injectivity treatments, scale treatments (surface and subsurface-wells equipment, pipelines, facilities), filter cake removal, tubing pickling, bullhead/annular squeezes and soaks, cement squeezes, fluids pH control, stuck pipe treatment.

Therefore, the present invention answers the need for both a simpler manufacturing process and abridged, novel organic acid compositions for use in high volume operations in oilfields throughout the world.

Consequently, there is still a need for compositions for use in the oil industry which can be used over a range of applications which can decrease a number of the associated dangers/issues typically associated with acid applications to the extent that these acid compositions are considered much safer for handling on worksites, stable at a range of temperatures, and which are chloride-free.

SUMMARY OF THE INVENTION

Compositions according to the present invention have been developed for the oil and gas industry and its associated applications by specifically targeting the problems of corrosion, logistics-handling, human-environmental exposure, formation fluid compatibilities, flow-back fluid compatibilities, biodegradability, chloride content and high temperature stability.

It is an object of the present invention to provide a novel organic acid composition which can be used over a broad range of applications in the oil and gas industry and which will exhibit advantageous properties over known compositions, but more specifically for operations requiring a high solubilizing effect on various high strength cements utilized in the oil and gas industry down hole. According to a preferred embodiment of the present invention, the novel organic acid composition should be able to highly solubilize various types of downhole scales, without any presence of chloride ions in the acid composition.

According to one aspect of the present invention, there is provided a novel organic acid composition which, upon proper use, results in a very low corrosion rate of oil and gas industry activities equipment on most all types of metals According to another aspect of the present invention, there is provided a novel organic acid composition for use in the oil industry which is readily biodegradable.

According to another aspect of the present invention, there is provided a novel organic acid composition for use in the oil industry which is non-fuming, non-toxic, and has a highly controlled manufacturing process ensuring consistent end product strength.

According to another aspect of the present invention, there is provided a novel organic acid composition for use in the oil industry which has a pH below 1. Preferred compositions according to the present invention can be utilized in common day to day operations utilizing organic and mineral acids in the oil and gas industry which operations are selected from the group consisting of: matrix acidizing, fracture acidizing, and spearhead breakdown acidizing.

According to another aspect of the present invention, there is provided a novel organic acid composition that is stable at very high temperatures (>180° C.).

According to a preferred embodiment of the present invention, there is provided a novel organic acid composition for use in the oil industry which has high salinity tolerance. A tolerance for high salinity fluids, or brines, is desirable for onshore and offshore acid applications. Typical acids are blended with fresh water and additives, typically far offsite, and then transported to the area of treatment as a finished blend. It is advantageous to have an alternative that can be transported as a concentrate safely to the treatment area, then blended with a high salinity produced water or sea water greatly reducing the logistics requirement typical with conventional acid systems. A typical acid system could precipitate salts/minerals heavily if blended with fluids of an excessive salinity level resulting in formation plugging or ancillary damage inhibiting production and substantially increasing costs. Brines are also typically present in formations, thus having an acid system that has a high tolerance for brines greatly reduces the potential for formation damage or emulsions down-hole during or after product placement/application.

According to another aspect of the present invention, there is provided a novel organic acid composition for use in the oil industry which is immediately reactive upon contact/application.

According to another aspect of the present invention, there is provided a novel organic acid composition that has a high solubilizing effect on high strength cements commonly utilized down hole in the oil and gas industry.

Most cement blends commonly utilized in the oil and gas industry have minimal acid solubility, hindering the effectiveness of most conventional acids. Preferred embodiments of the present invention will readily solubilize these cement blends, which effectively save the operator substantial time and potentially reducing the volumes required to achieve a clean path from the wellbore to the formation/zone of interest.

According to another aspect of the present invention, there is provided a novel organic acid composition that has a high solubilizing effect on various downhole scales without any chloride ions present in the composition.

Accordingly, the product would overcome many of the drawbacks found in the use of compositions of the prior art related to the oil and gas industry.

According to an aspect of the present invention, there is provided an organic acid composition for use in oil industry activities, said composition comprising: methanesulphonic acid; a metal iodide or iodate; and an alcohol or derivative thereof.

According to a preferred embodiment of the present invention, the metal iodide or iodate is cuprous iodide. According to another preferred embodiment, the metal iodide or iodate is potassium iodide. According to another preferred embodiment, the metal iodide or iodate is sodium iodide. According to yet another preferred embodiment, the metal iodide or iodate is lithium iodide.

According to a preferred embodiment of the present invention, the alcohol or derivative thereof is an alkynyl alcohol or derivative thereof. Preferably, the alkynyl alcohol or derivative thereof is propargyl alcohol or a derivative thereof. Preferably, the alkynyl alcohol or derivative thereof is present in a concentration ranging from 0.05 to 2.0% w/w, preferably from 0.05 to 1.0% w/w. More preferably, the alkynyl alcohol or derivative thereof is present in a concentration of 0.25% w/w.

According to a preferred embodiment of the present invention, the metal iodide is present in a concentration ranging from 100 to 10000 ppm, more preferably from 100 to 5000 ppm. Preferably, the metal iodide is present in a concentration of 1000 ppm.

According to a preferred embodiment of the present invention, there is provided an organic acid composition for use in oil industry activities, said composition comprising:
  water present in an amount ranging from 30 to 80% by weight of the weight of the composition;
  methanesulphonic acid present in an amount ranging from 30 to 70% by weight of the weight of the composition;
  a metal iodide or iodate present in an amount of no more than 1% by weight of the weight of the composition; and
  an alcohol or derivative thereof present in an amount of no more than 2% by weight of the weight of the composition.

According to a preferred embodiment of the present invention, the major solvent of the composition is water which thus makes the composition an environmentally friendly composition for use in oil industry operations.

According to a preferred embodiment of the present invention, the composition uses water used as solvent which allows for increased solubilising of $CaCO_3$ which thus makes the composition both an environmentally friendly composition and effective in various oil industry operations.

According to an aspect of the present invention, there is provided a use of an organic acid composition in the oil industry to stimulate formations.

According to an aspect of the present invention, there is provided a use of an organic acid composition in the oil industry to assist in reducing breakdown pressures during downhole pumping operations.

According to an aspect of the present invention, there is provided a use of an organic acid composition in the oil industry to treat wellbore filter cake post drilling operations.

According to an aspect of the present invention, there is provided a use of an organic acid in the oil industry to assist in freeing stuck pipe.

According to an aspect of the present invention, there is provided a use of an organic acid composition in the oil industry to descale pipelines and/or production wells.

According to an aspect of the present invention, there is provided a use of an organic acid composition in the oil industry to increase injectivity of injection wells.

According to an aspect of the present invention, there is provided a use of an organic acid composition in the oil industry to lower the pH of fluids.

According to an aspect of the present invention, there is provided a use of an organic acid composition in the oil industry to remove undesirable scale in surface equipment, wells and related equipment and/or facilities.

According to an aspect of the present invention, there is provided a use of an organic acid composition in the oil industry to fracture wells.

According to an aspect of the present invention, there is provided a use of an organic acid composition in the oil industry to complete matrix stimulations.

According to an aspect of the present invention, there is provided a use of an organic acid composition in the oil industry to conduct annular and bullhead squeezes and soaks.

According to an aspect of the present invention, there is provided a use of an organic acid composition in the oil industry to pickle tubing, pipe and/or coiled tubing.

According to an aspect of the present invention, there is provided a use of an organic acid composition in the oil industry to increase effective permeability of formations.

According to an aspect of the present invention, there is provided a use of an organic acid composition in the oil industry to reduce or remove wellbore damage.

According to an aspect of the present invention, there is provided a use of an organic acid composition in the oil industry to clean perforations.

According to an aspect of the present invention, there is provided a use of an organic acid composition in the oil industry to solubilize limestone, dolomite, calcite and combinations thereof.

DETAILED DESCRIPTION OF THE PREFERRED EMBODIMENTS

It will be appreciated that, numerous specific details have provided for a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered so that it may limit the scope of the embodiments described herein in any way, but rather as merely describing the implementation of the various embodiments described herein.

The description that follows, and the embodiments described therein, are provided by way of illustration of an example, or examples, of particular embodiments of the principles of the present invention. These examples are provided for the purposes of explanation, and not limitation, of those principles and of the invention.

According to an aspect of the invention, there is provided a novel organic acid composition comprising: methanesulphonic acid; a metal iodide or iodates, preferably cupric iodide, potassium iodide, lithium iodide or sodium iodide; and an alcohol or derivatives thereof, preferably alkynyl alcohol or derivatives thereof, more preferably 2-Propyn-1-ol (or a derivative of) complexed with methyloxirane.

Alcohols and derivatives thereof, such as alkyne alcohols and derivatives and more preferably 2-Propyn-1-ol complexed with methyloxirane can be used as corrosion inhibitors. Propargyl alcohol itself is traditionally used as a corrosion inhibitor which works extremely well at low concentrations. It is however a very toxic/flammable chemical to handle as a concentrate, so care must be taken while handling the concentrate. In the composition according to the present invention, 2-Propyn-1-ol complexed with methyloxirane is utilized where the toxic effect does not negatively impact the safety of the composition. There are derivatives of propargyl alcohol available in the industry now that are considered safe to handle, non-regulated, and approved for use in North Sea Offshore Oilfield applications. This is the preferred chemistry for the present composition.

Metal iodides or iodates such as potassium iodide, sodium iodide, cuprous iodide and lithium iodide can potentially be used as corrosion inhibitor intensifier. In fact, potassium iodide is a metal iodide traditionally used as corrosion inhibitor intensifier, however it is expensive, but works extremely well. It is non-regulated, friendly to handle, and listed on the offshore PLONOR (Pose Little Or NO Risk) list as safe chemicals to the environment.

EXAMPLE 1

Formulation and Process to Prepare a Composition According to a Preferred Embodiment of the Invention Start by combining the methanesulphonic acid with the water and mix thoroughly for a few minutes. Add 2-Propyn-1-ol, complexed with methyloxirane, and potassium iodide. Circulation is maintained until all products have been solubilized. Table 1 lists the components of the composition of Example 1, including their weight percentage as compared to the total weight of the composition and the CAS numbers of each component.

TABLE 1

Composition of a preferred embodiment of the present invention

| Chemical | % Wt Composition | CAS# |
| --- | --- | --- |
| Water | 57.65% | 7732-18-5 |
| Methane Sulphonic Acid | 42% | 75-75-2 |
| 2-Propyn-1-ol, complexed with methyloxirane | 0.25% | 38172-91-7 |
| Potassium Iodide | 0.1% | 7681-11-0 |

The resulting composition of Example 1 is a clear, odourless liquid having shelf-life of greater than 1 year. It has a freezing point temperature of approximately minus 30° C. and a boiling point temperature of approximately 100° C. It has a specific gravity of 1.21±0.02. It is completely soluble in water and its pH is less than 1.

The composition is readily biodegradable, non-fuming and has no volatile organic compounds nor does it have any BTEX levels above the drinking water quality levels. BTEX refers to the chemicals benzene, toluene, ethylbenzene and xylene. Surrogate toxicity testing carried out on rats shows the $LD_{50}$ to be not less than 1100 mg/kg.

With respect to the corrosion impact of the composition on typical oilfield grade steel, it was established that it was clearly well below the acceptable corrosion limits set by industry for certain applications, such as spearhead applications or downhole scaling.

In preferred embodiments of the present invention 2-Propyn-1-ol complexed with methyloxirane can be present in a range of 0.05-2.0%, preferably 0.05 to 1%, more preferably it is present in an amount of approximately 0.25%. Potassium Iodide can be present in a range of 0.01-1.0%, more preferably from 0.01-0.5%. According to certain preferred embodiments, it is preferably it is present in an amount of approximately 0.1%.

As a substitute for 2-Propyn-1-ol complexed with methyloxirane one could use propargyl alcohol, however, 2-Propyn-1-ol complexed with methyloxirane is preferable. As a substitute for potassium iodide one could use sodium iodide, copper iodide and lithium iodide. However, potassium iodide is the most preferred.

Corrosion Testing

The compositions according to the present invention were exposed to corrosion testing. Samples of N80 grade steel were exposed to various novel organic acid solutions for periods of time ranging up to 24 hours at 90° C. temperatures.

TABLE 2

Corrosion testing using the composition of Example 1

| Coupon-Concentration | Initial wt. (g) | Final wt. (g) | Loss wt. (g) | Surface area (cm2) | Density (g/cc) | Run time (hours) | Mils/yr | Mm/year | Lb/ft2 |
|---|---|---|---|---|---|---|---|---|---|
| N80-100% of the formulation of Ex. 1 | 40.469 | 40.429 | 0.040 | 27.11 | 7.86 | 6 | 107.901 | 2.741 | 0.003 |
| N80-100% of the formulation of Ex. 1 | 40.469 | 40.404 | 0.065 | 27.11 | 7.86 | 24 | 43.834 | 1.113 | 0.005 |
| N80-33% of the formulation of Ex. 1 | 40.774 | 40.509 | 0.265 | 27.11 | 7.86 | 6 | 714.845 | 18.157 | 0.019 |
| N80-33% of the formulation of Ex. 1 | 40.774 | 39.776 | 0.998 | 27.11 | 7.86 | 24 | 673.033 | 17.095 | 0.072 |

This type of corrosion testing helps to determine the impact of the use of such novel organic replacement acid composition according to the present invention compared to the industry standard (HCl alone or any other mineral or organic acid). Additionally, the compositions according to the present invention will allow the end user to utilize an alternative to conventional acids that has the down-hole performance advantages, transportation and storage advantages as well as the health, safety and environmental advantages for a nominal cost difference. Improvement in corrosion control is one of the distinct advantages of the present invention. The high salt tolerance is another advantage of composition according to the present invention.

Aquatic Toxicity Testing

The biological test method that was employed was the Reference Method for Determining acute lethality using rainbow trout (1990—Environment Canada, EPS 1/RM/9—with the May 1996 and May 2007 amendments).

The formulation tested was the following: 42% MSA+ 0.5% Basocorr+500 ppm KI+0.2% surfactant. Basocorr® is a tradename for a corrosion inhibitor from BASF.

The Trout 96 hour Acute Test (WTR-ME-041) was performed at 5 different concentrations of compositions (62.5, 125, 250, 500 and 1000 ppm) one replicate per treatment, ten fish per replicate.

The test results indicate that at concentrations of the formulation tested of up to and including 500 ppm there was a 100% survival rate in the fish sample studied. This is an indicator that the formulation tested demonstrates a very acceptable environmental safety profile.

Oral Toxicity

The composition of Example 1 was tested on rats to assess the oral toxicity. It was determined to be as follows: LD50 (Rat) 650 mg/kg Environmental Testing The biodegradability of formulation of Example 1 was tested following the OECD 301A (new version) test.

The dissolved organic carbon (DOC) reduction→70% (product is readily biodegradable), thus confirming that the formulation tested was biodegradable.

Marble Dissolution Testing

The potential to dissolve marble was tested using several strength of two blends according to preferred embodiments of the present invention. This test helps to assess the extent and reactivity of formulations according to the present invention with respect to downhole operations.

The test involved exposing 25 ml of acid with excess of marble chips at 20° C. As a control, 25 ml of 42% MSA will dissolve 7.2 g of marble and evolve 3.268 g of $CO_2$.

| Formulation A: | 42% MSA | Formulation B: | 35% MSA |
|---|---|---|---|
| | 0.2% Basocorr ® | | 0.5% Basocorr ® |
| | 200 ppm KI | | 500 ppm KI |
| | | | 0.2% surfactant |

TABLE 3

Weight loss (in grams) vs Time of Exposure (in minutes)

| Composition | 0 | 0.5 | 1 | 5 | 10 | 20 | 40 | 60 | 80 | 120 | 200 |
|---|---|---|---|---|---|---|---|---|---|---|---|
| Formulation A at 100% blend | 0 | 0.002 | 0.003 | 0.009 | 0.016 | 0.036 | 0.089 | 0.141 | 0.188 | 0.283 | 0.454 |
| Formulation A at 50% blend | 0 | 0.016 | 0.036 | 0.24 | 0.469 | 0.75 | 1.035 | 1.16 | 1.23 | 1.312 | 1.412 |
| Formulation A at 33% blend | 0 | 0.01 | 0.018 | 0.117 | 0.235 | 0.421 | 0.64 | 0.744 | 0.804 | 0.878 | 0.958 |
| Formulation B at 50% | 0 | 0.005 | 0.016 | 0.146 | 0.303 | 0.546 | 0.836 | 1.024 | 1.134 | 1.234 | 1.304 |
| Formulation B at 33% | 0 | 0.005 | 0.013 | 0.131 | 0.272 | 0.476 | 0.665 | 0.734 | 0.77 | 0.809 | 0.84 |

For Formulation A at 50% blend, at 100% spent the evolution of $CO_2$ was of 1.634 grams.

For Formulation A at 33% blend, at 100% spent the evolution of $CO_2$ was of 1.08 grams.

EXAMPLE 2

A composition according to a preferred embodiment of the present invention was prepared similarly to Example 1 with the following components:

TABLE 4

Composition of Example 2

| Chemical | % Wt of the Composition |
|---|---|
| Water | 56.9% |
| Methane Sulphonic Acid | 42% |
| 2-Propyn-1-ol, complexed with methyloxirane | 1.0% |
| Potassium Iodide | 0.1% |

Corrosion Testing at Various Temperatures

Various compositions according to the present invention were tested for corrosion inhibition at various temperatures on N80 steel for an exposure period of 6 hours. Various levels of additives were used as well. The density of N80 steel was 7.86 g/cc and the surface area of the coupons was of 28.0774 $cm^2$. In the examples with an additional inhibitor, the inhibitors were added to the composition of Example 2. Table 5 lists the results of these corrosion tests.

TABLE 5

Corrosion Tests on N80 Steel

| Composition | Additional Additives | Temp (° C.) | Initial wt. (g) | Final wt. (g) | Loss wt. (g) | Mils/yr | Mm/year | Lb/ft2 |
|---|---|---|---|---|---|---|---|---|
| Example 2 | 0.01% KI 0.25% PP | 90 | 49.9458 | 48.0432 | 1.903 | 4955.487 | 125.869 | 0.139 |
| Example 2 (diluted 50%) | 0.01% KI 0.25% PP | 90 | 49.5539 | 45.8917 | 3.662 | 9538.518 | 242.278 | 0.267 |
| Example 2 | 0.1% KI 1% PP | 90 | 50.1339 | 50.1239 | 0.010 | 26.04587 | 0.662 | 0.001 |
| Example 2 (diluted 50%) | 0.1% KI 1% PP | 90 | 49.729 | 49.156 | 0.573 | 1492.428 | 37.908 | 0.042 |
| Example 2 (diluted 50%) | 0.2% KI 2% PP | 150 | 49.728 | 45.0934 | 4.635 | 12071.22 | 306.609 | 0.338 |
| Example 2 (diluted 50%) | 0.2% KI 2% PP | 90 | 49.735 | 49.7185 | 0.017 | 42.97568 | 1.092 | 0.001 |
| Example 2 (diluted 50%) | 0.5% KI 5% PP | 150 | 50.4625 | 47.2427 | 3.220 | 8386.249 | 213.011 | 0.228 |

PP signifies propyn-1-ol with methyloxirane

KI signifies Potassium Iodide

Corrosion Testing on J55 Steel

Various compositions according to the present invention were tested for corrosion inhibition at various temperatures on J55 steel for an exposure period of 6 hours. Various levels of additives were used as well. The density of J55 steel was 7.86 g/cc and the surface area of the coupons was of 28.922 $cm^2$. In the example with an additional inhibitor, the inhibitor was simply added to the composition of Example 2. Table 6 lists the results of these corrosion tests.

TABLE 6

Corrosion Tests on J55 Steel at 70° C.

| Composition | Additional Additives | Initial wt. (g) | Final wt. (g) | Loss wt. (g) | Mils/yr | Mm/Year | Lb/ft2 |
|---|---|---|---|---|---|---|---|
| Example 2 | 0.3% PP | 35.0398 | 30.749 | 4.291 | 10849.4 | 275.575 | 0.304 |
| Example 2 | None | 35.6715 | 35.6591 | 0.012 | 31.35372 | 0.796 | 0.001 |
| Example 2 (50% diluted) | None | 33.8271 | 33.7974 | 0.030 | 75.09722 | 1.907 | 0.002 |

PP signifies propyn-1-ol complexed with methyloxirane
KI signifies Potassium Iodide Solubility Testing Various compositions according to the present invention were tested for dissolving ability. Its solubilising power (in kg per $m^3$) was assessed by exposing 50 ml of the compositions to chunks of calcium carbonate at a temperature of 23° C. for a period of up to 225 minutes. The results of the solubilising tests are reported in Table 7 below.

TABLE 7

Results of Solubilising Tests of $CaCO_3$ Chunks

| Composition | Initial Weight/g | Final Weight/g | Weight Loss/g | Total Solubility kg per $m^3$ |
|---|---|---|---|---|
| M5 | 15.0406 | 10.65 | 4.3906 | 88 |
| Example 2 | 20.0055 | 5.7827 | 14.2228 | 284 |
| Example (diluted 50%) | 19.9902 | 11.6328 | 8.3574 | 167 |

M5: commercialized MSA-containing composition

Elastomer Testing

When common sealing elements used in the oil and gas industry come in contact with acid compositions they tend to degrade or at least show sign of damage. A number of sealing elements common to the industry were exposed to a composition according to a preferred embodiment of the present invention to evaluate the impact of the latter on their integrity. More specifically, the hardening and drying and the loss of mechanical integrity of sealing elements can have substantial consequences to the operations of wells and result in undesirable shut downs to replace defective sealing elements. Testing was carried out to assess the impact of the exposure of composition of Example 2 to various elastomers. Table 8 relates the results of the long term (72 hour exposure) elastomer testing on the concentrated product of Example 2 at 70° C. and 28,000 kPa showed little to no degradation of various elastomers, including Nitrile 70®, Viton 75®, Aflas 80®, and EPDM 70 style sealing elements.

TABLE 8

Results of the Elastomer Testing

| Elastomer | Weight before/g | Weight after/g | Weight Change/g | Thickness before/g | Thickness after/g |
|---|---|---|---|---|---|
| Nitrile ®70 | 2.0815 | 2.1381 | −0.0566 | 0.135 | 0.135 |
| AFLAS ®80 | 2.9354 | 2.9402 | −0.0048 | 0.135 | 0.135 |

TABLE 8-continued

Results of the Elastomer Testing

| Elastomer | Weight before/g | Weight after/g | Weight Change/g | Thickness before/g | Thickness after/g |
|---|---|---|---|---|---|
| VITON ®75D | 3.0794 | 3.0855 | −0.0061 | 0.135 | 0.135 |
| EPDM 70D | 1.6706 | 1.6849 | −0.0143 | 0.135 | 0.135 |

Properties

The formulation of Example 2 was analyzed and various physical and chemical properties of the undiluted and diluted composition were recorded in Table 9.

TABLE 9

Various Physical and Chemical Properties of the Formulation of Example 1 at Full Strength and Upon Dilution by Half.

| | Example 2 composition undiluted | Example 2 composition 50% undiluted |
|---|---|---|
| Appearance | Yellow liquid | Yellow liquid |
| Specific Gravity at 23 C. | 1.224 | 1.12 |
| Salinity, % | 32% | 16% |
| Odor | Slight | Slight |
| Freezing Point | −30° C. | −25° C. |
| Boiling Point | >100° C. | >100° C. |
| pH | −0.3 | −0.1 |

Corrosion Testing on Aluminum

Corrosion testing was carried out on aluminum coupons (density of 2.73 g/cc) at 55° C. for a period of 72 hours. The composition of Example 2 provided a substantial corrosion resistance improvement over a 15% composition of HCl and comparable corrosion resistance to methanesulfonic acid. The surface area of the coupons was 31.53 $cm^2$. The results are reported in Table 10. The aluminum corrosion was below the required minimum of 6.25 mm/year.

TABLE 10

Results of the Aluminum Corrosion test

|  | Initial weight (g) | Final weight (g) | Loss weight (g) | Mils/yr | Mm/year | Lb/ft2 |
|---|---|---|---|---|---|---|
| MSA (70%) | 6.2763 | 6.2582 | 0.018 | 10.07231 | 0.256 | 0.001 |
| Example 2 | 6.3235 | 6.2476 | 0.076 | 42.23691 | 1.073 | 0.005 |
| 15% HCl | 6.3114 | 0 | 6.311 | 3512.175 | 89.209 | 0.410 |

PP signifies propyn-1-ol complexed with methyloxirane
KI signifies Potassium Iodide Corrosion Testing on Chrome Coupons Corrosion testing was carried out on Chrome 13 coupons at 55° C. for a period of 72 hours. The composition of Example 2 provided an improvement in the corrosion resistance versus both the MSA and the 15% HCl compositions. The coupons had a surface area of 30.88 cm$^2$, and a density of 7.72 g/cc. The results of the test are reported in Table 11.

TABLE 11

Results of the Corrosion test on Chrome Coupons

| composition | Initial weight (g) | Final weight (g) | Loss weight (g) | Mils/yr | Mm/year | Lb/ft2 |
|---|---|---|---|---|---|---|
| MSA (70%) | 34.5027 | 33.9685 | 0.534 | 107.3362 | 2.726 | 0.035 |
| Example 2 | 34.6241 | 34.4707 | 0.153 | 30.8225 | 0.783 | 0.010 |
| 15% HCl | 34.2636 | 22.7195 | 11.544 | 2319.543 | 58.916 | 0.767 |

PP signifies propyn-1-ol complexed with methyloxirane
KI signifies Potassium Iodide Corrosion Testing on Chromed Stainless Steel Coupons Corrosion testing was carried out on stainless steel coupons having a chromed surface at 55° C. for a period of 72 hours. The composition of Example 2 provided an improvement in the corrosion resistance versus both the MSA and the 15% HCl compositions. The surface area of the coupons was 33.22 cm$^2$, the density of the coupons was 7.86 g/cc. The results are reported in Table 12.

TABLE 12

Corrosion Test Results on Chromed Stainless Steel Coupons

|  | Initial weight (g) | Final weight (g) | Loss weight (g) | Mils/yr | Mm/year | Lb/ft2 |
|---|---|---|---|---|---|---|
| MSA | 32.11 | 31.4169 | 0.693 | 127.1484 | 3.230 | 0.043 |
| Example 2 | 32.24 | 32.1923 | 0.048 | 8.750507 | 0.222 | 0.003 |
| 15% HCl | 32.1035 | 29.0324 | 3.071 | 563.3896 | 14.310 | 0.189 |

PP signifies propyn-1-ol complexed with methyloxirane
KI signifies Potassium Iodide Filter Cake Test A filter cake was formed on a ceramic disc by heating the drilling mud (whose composition is set out in Table 15) to 50° C. with an applied pressure of 500 psi using 12 micron aloxite disc to build 2 filter cakes. A substantial filter cake was formed. The drilling fluid was subsequently removed from the cell and replaced with the breaker fluid.

4 Kg/m$^3$ of Can-Break ECA was used as control filter cake breaker and the composition of Example 1 was used as the composition according to a preferred embodiment of the present invention. After 16 hours of exposure, the breaker fluid was removed and the cell was dismantled to show the filter cake on the ceramic disc. Upon visual observation, the composition according to the present invention had removed a significant amount of the filter cake while the standard mud enzyme breaker barely had any impact.

TABLE 13

Composition of Mud System used in the Filter Cake Test

| Components of mud system | Unit | Amount |
|---|---|---|
| Bentonite | Kg/m$^3$ | 30 |
| PACR | Kg/m$^3$ | 2 |
| Starch | Kg/m$^3$ | 4 |
| Desco CF | Kg/m$^3$ | 0.25 |
| Cal Carb 325 | Kg/m$^3$ | 20 |
| Drilled solids | % | 3 |

Adjusted to pH 10 with caustic soda

Table 14 summarizes the various uses (or applications) of the compositions according to the present invention upon dilution thereof ranging from approximately 1 to 75% dilution, include, but are not limited to: injection/disposal in wells; squeezes and soaks or bullheads; acid fracturing, acid washes or matrix stimulations; fracturing spearheads (breakdowns); pipeline scale treatments; cement breakdowns or perforation cleaning; pH control; and de-scaling applications.

TABLE 14

Various applications and suggested dilutions for compositions according to preferred embodiment of the present invention

| Application | Suggested Dilution | Benefits |
|---|---|---|
| Injection/ Disposal Wells | 50% | Compatible with mutual solvents and solvent blends, very cost effective. |
| Squeezes & Soaks Bullhead Annular | 33%-50% | Ease of storage and handling, cost effective compared to conventional acid stimulations. Ability to leave pump equipment in wellbore. |
| Acid Fracs | 50%-66% | Decreased shipping and storage compared to conventional acid, no blend separation issues, comprehensive spend rate encourages deeper formation penetration. |
| Frac Spearheads (Break-downs) | 33%-66% | Able to adjust concentrations on the fly. Decreased shipping and storage on location. |
| Cement Break-downs | 50% | Higher concentrations recommended due to lower temperatures, and reduced solubility of aged cement. |
| pH Control | 0.1%-1.0% | Used in a variety of applications to adjust pH level of water based systems. |
| Liner De-Scaling, Heavy Oil | 1%-5% | Continuous injection/de-scaling of slotted liners, typically at very high temperatures. |

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method for:
   stimulating a formation;
   descaling pipelines or production wells;
   reducing breakdown pressures during downhole pumping operations;
   treating wellbore filter cake post drilling operations;

assisting with freeing stuck pipe;
increasing injectivity of injection wells;
lowering the pH of fluids;
removing undesirable scale in surface equipment, wellbores and related equipment or facilities;
fracturing wells;
completing matrix stimulations;
conducting annular and bullhead squeezes and soaks;
pickling tubing, pipe and/or coiled tubing;
increasing effective permeability of formations;
reducing or removing wellbore damage;
cleaning perforations; or
solubilizing limestone, dolomite, calcite and combinations thereof;
comprising the steps of introducing an organic acid composition into an oil field operation or system, said organic acid composition comprising water in an amount ranging from 30 to 80% by weight of the weight of the composition; methanesulphonic acid in an amount ranging from 30 to 70% by weight of the weight of the composition; a metal iodide or iodate in an amount of no more than 1% by weight of the weight of the composition; and an alcohol or derivative thereof in an amount of no more than 2% by weight of the weight of the composition; wherein the organic acid composition has a pH less than 1.0 and a shelf life of greater than 12 months prior to being introduced to the system or operation,
wherein the oil field operation or system is selected from the group comprising a subterranean formation, a wellbore, an injection well, a product well, oilfield equipment, pipe and tubing.

2. The method according to claim 1, wherein the metal iodide or iodate is selected from the group consisting of: cuprous iodide; potassium iodide; sodium iodide and lithium iodide.

3. The method according to claim 1, wherein the metal iodide or iodate is potassium iodide.

4. The method according to claim 1, wherein the alcohol or derivative thereof is an alkynyl alcohol or derivative thereof.

5. The method according to claim 1, wherein the alkynyl alcohol or derivative thereof is propargyl alcohol or a derivative thereof.

6. The method according to claim 1, wherein the alkynyl alcohol or derivative thereof is present in a concentration ranging from 0.05 to 2.0% w/w.

7. The method according to claim 1, wherein the alkynyl alcohol or derivative thereof is present in a concentration ranging from 0.05 to 1.0% w/w.

8. The method according to claim 1, wherein the alkynyl alcohol or derivative thereof is present in a concentration of 0.25% w/w.

9. The method according to claim 1, wherein the metal iodide is present in a concentration ranging from 100 to 10000 ppm.

10. The method according to claim 1, wherein the metal iodide is present in a concentration ranging from 100 to 5000 ppm.

11. The method according to claim 1, wherein the metal iodide is present in a concentration of 1000 ppm.

* * * * *